(12) United States Patent
Shiokawa et al.

(10) Patent No.: US 11,390,011 B2
(45) Date of Patent: Jul. 19, 2022

(54) METHOD AND DEVICE FOR MANUFACTURING LIQUID-FILLED CONTAINER

(71) Applicant: YOSHINO KOGYOSHO CO., LTD., Tokyo (JP)

(72) Inventors: Mitsuru Shiokawa, Tokyo (JP); Hideaki Hoshino, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 17/269,809

(22) PCT Filed: Jun. 6, 2019

(86) PCT No.: PCT/JP2019/022608
§ 371 (c)(1),
(2) Date: Feb. 19, 2021

(87) PCT Pub. No.: WO2020/044710
PCT Pub. Date: Mar. 5, 2020

(65) Prior Publication Data
US 2021/0331370 A1  Oct. 28, 2021

(30) Foreign Application Priority Data
Aug. 31, 2018  (JP) .............................. JP2018-163906

(51) Int. Cl.
*B29C 49/42* (2006.01)
*B29C 49/46* (2006.01)
(Continued)

(52) U.S. Cl.
CPC .......... *B29C 49/4289* (2013.01); *B29C 49/46* (2013.01); *B29C 49/58* (2013.01);
(Continued)

(58) Field of Classification Search
CPC ..... B29C 49/4289; B29C 49/46; B29C 49/58; B29C 2049/4664; B29C 2049/5803
See application file for complete search history.

(56) References Cited

U.S. PATENT DOCUMENTS

| 2008/0029928 | A1  | 2/2008 | Andison et al. | |
| 2020/0156302 | A1* | 5/2020 | Hoshino | B29C 49/58 |
| 2020/0361133 | A1* | 11/2020 | Okuyama | B29C 49/12 |

FOREIGN PATENT DOCUMENTS

| JP | 2009-533290 A | 9/2009 |
| JP | 5806929 B2 | 11/2015 |
| JP | 2016-165907 A | 9/2016 |

OTHER PUBLICATIONS

Sep. 10, 2019 International Search Report issued in International Patent Application No. PCT/JP2019/022608.

* cited by examiner

*Primary Examiner* — Robert B Davis
(74) *Attorney, Agent, or Firm* — Oliff PLC

(57) ABSTRACT

In a liquid container manufacturing method, a nozzle unit includes a flow path that is configured to be opened and closed by a valve embedded in a blow nozzle, and a seal pin arranged in a pin accommodating space included in the flow path has a protruding portion configured to enter a communication space in a closed state of the valve. The liquid container manufacturing method includes a liquid blow molding step of molding a preform into the liquid container, by supplying, to an interior of the preform, a pressurized liquid.

13 Claims, 11 Drawing Sheets

(51) Int. Cl.
*B29C 49/58* (2006.01)
*B29K 23/00* (2006.01)
*B29K 67/00* (2006.01)
*B29L 31/00* (2006.01)

(52) U.S. Cl.
CPC ......... *B29C 2049/4664* (2013.01); *B29C 2049/5803* (2013.01); *B29K 2023/12* (2013.01); *B29K 2067/003* (2013.01); *B29L 2031/7158* (2013.01)

METHOD AND DEVICE FOR MANUFACTURING LIQUID-FILLED CONTAINER

TECHNICAL FIELD

This application relates to a liquid container manufacturing method and a liquid container manufacturing apparatus for manufacturing, from a synthetic resin preform, a liquid container containing a content liquid.

BACKGROUND

Synthetic resin containers, typical examples of which include polypropylene (PP) bottles and polyethylene terephthalate (PET) bottles, have been used to contain, as content liquids, a variety of liquids, such as beverages, cosmetic products, pharmaceutical products, detergents, and toiletries including shampoo. Such a container is typically manufactured by blow molding a preform which has been formed of a thermoplastic synthetic resin material as described above.

Known techniques for blow molding the preform into the container include liquid blow molding in which, instead of pressurized air, a pressurized liquid is used as a pressurizing medium to be supplied to an interior of the preform.

For example, Patent Literature 1 describes a liquid blow molding method in which a synthetic resin preform, after having been heated in advance to a temperature at which stretchability is achieved, is placed in a blow-molding mold, and a liquid which is pressurized to a predetermined pressure using a pressurizing unit, such as a pump, is supplied to the interior of the preform through a blow nozzle. In this way, the synthetic resin preform is molded into a container having a predetermined shape conforming to a cavity of the blow-molding mold.

By using, as the liquid to be supplied to the preform, a content liquid that is to be contained in the container as a final product, the above liquid blow molding method allows molding of the container to occur concurrently with filling of the content liquid to the container, so as to manufacture the liquid container containing the content liquid. The liquid container manufacturing method using the liquid blow molding therefore omits the step of filling the content liquid to the molded container, thereby allowing low-cost manufacturing of the liquid container.

CITATION LIST

Patent Literature

PTL 1: JP 5806929 B2

SUMMARY

Technical Problem

In the liquid blow molding method as described above, there can be provided a flow path for air discharge, drawing, or the like which is open to an inner circumferential surface of the blow nozzle. In the process of liquid blow molding, however, the filled content liquid can enter the flow path from the opening at the inner circumferential surface of the blow nozzle. After entering the flow path, the content liquid can return to the container, thus sometimes making it difficult to stabilize the amount of the content liquid or causing liquid-dripping from the blow nozzle when the blow nozzle is disengaged from a mouth.

It would be helpful to provide a liquid container manufacturing method and a liquid container manufacturing apparatus that are capable of preventing entry of the content liquid into the flow path which is open to the inner circumferential surface of the blow nozzle.

Solution to Problem

One aspect of the present disclosure resides in a liquid container manufacturing method for manufacturing, from a synthetic resin preform, a liquid container containing a content liquid using a nozzle unit and a blow-molding mold, wherein the nozzle unit includes:
a liquid supply path that is connected to a pressurized liquid supply source and that extends to a blow nozzle; and
a flow path that extends from an opening provided on an inner circumferential surface of the blow nozzle to an interior of the nozzle unit and that is configured to be opened and closed by a valve embedded in the blow nozzle, and
the flow path includes:
a communication space adjacent to the opening; and
a pin accommodating space which is adjacent to the communication space and in which a seal pin configured to make advancing and retracting movements along an axial direction is arranged, and wherein
the seal pin has a protruding portion configured to enter the communication space in a closed state of the valve,
the liquid container manufacturing method including
a liquid blow molding step of molding the preform into the liquid container having a shape conforming to an inner surface of the blow-molding mold, by supplying, through the liquid supply path to an interior of the preform, a pressurized liquid using the pressurized liquid supply source in a state in which the blow nozzle is engaged to a mouth of the preform.

In a preferred embodiment of the liquid container manufacturing method configured as above, the liquid container manufacturing method includes
a headspace forming step of forming a headspace in the liquid container, by discharging the liquid from an interior of the liquid container, wherein
in the headspace forming step, the liquid is discharged from the interior of the liquid container, by closing the liquid supply path and introducing a pressurized gas to the interior of the liquid container through the flow path.

In another preferred embodiment of the liquid container manufacturing method configured as above, the liquid container manufacturing method further includes
an air discharge step, performed prior to the liquid blow molding step, of discharging air in the interior of the preform to outside through the flow path, by supplying the liquid to the interior of the preform.

In still another preferred embodiment of the liquid container manufacturing method configured as above, in the air discharge step, the valve is in a half-open state between a fully open state, in which the seal pin is at a position furthest from the opening, and the closed state, in which the seal pin is at a position closest to the opening.

In still another preferred embodiment of the liquid container manufacturing method configured as above, before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

Another aspect of the present disclosure resides in a liquid container manufacturing apparatus including:

a nozzle unit; and a blow-molding mold, wherein the nozzle unit includes:

a liquid supply path that is connected to a pressurized liquid supply source and that extends to a blow nozzle; and a flow path that extends from an opening provided on an inner circumferential surface of the blow nozzle to an interior of the nozzle unit and that is configured to be opened and closed by a valve embedded in the blow nozzle, and the flow path includes:

a communication space adjacent to the opening; and a pin accommodating space which is adjacent to the communication space and in which a seal pin configured to make advancing and retracting movements along an axial direction is arranged, and wherein the seal pin has a protruding portion configured to enter the communication space in a closed state of the valve, the liquid container manufacturing apparatus being configured to mold the preform into the liquid container having a shape conforming to an inner surface of the blow-molding mold, by supplying, through the liquid supply path to an interior of the preform, a pressurized liquid using the pressurized liquid supply source in a state in which the blow nozzle is engaged to a mouth of the preform.

Advantageous Effect

The present disclosure provides a liquid container manufacturing method and a liquid container manufacturing apparatus that are capable of preventing entry of the content liquid into the flow path which is open to the inner circumferential surface of the blow nozzle

DETAILED DESCRIPTION

Hereinafter, the present disclosure will be described in more details with reference to the drawings.

A liquid container manufacturing method according to an embodiment of the present disclosure is a liquid container manufacturing method for manufacturing, from a synthetic resin preform, a liquid container containing a content liquid using a nozzle unit and a blow-molding mold, wherein the nozzle unit includes:

a liquid supply path that is connected to a pressurized liquid supply source and that extends to a blow nozzle; and a flow path that extends from an opening provided on an inner circumferential surface of the blow nozzle to an interior of the nozzle unit and that is configured to be opened and closed by a valve embedded in the blow nozzle, and the flow path includes:

a communication space adjacent to the opening; and a pin accommodating space which is adjacent to the communication space and in which a seal pin configured to make advancing and retracting movements along an axial direction is arranged, and wherein the seal pin has a protruding portion configured to enter the communication space in a closed state of the valve, the liquid container manufacturing method including a liquid blow molding step of molding the preform into the liquid container having a shape conforming to an inner surface of the blow-molding mold, by supplying, through the liquid supply path to an interior of the preform, a pressurized liquid using the pressurized liquid supply source in a state in which the blow nozzle is engaged to a mouth of the preform.

The liquid container manufacturing method according to the embodiment includes a headspace forming step of forming a headspace in the liquid container, by discharging the liquid from an interior of the liquid container, wherein in the headspace forming step, the liquid is discharged from the interior of the liquid container, by closing the liquid supply path and introducing a pressurized gas to the interior of the liquid container through the flow path.

The liquid container manufacturing method according to the embodiment further includes an air discharge step, performed prior to the liquid blow molding step, of discharging air in the interior of the preform to outside through the flow path, by supplying the liquid to the interior of the preform.

In the liquid container manufacturing method according to the embodiment, in the air discharge step, the valve is in a half-open state between a fully open state, in which the seal pin is at a position furthest from the opening, and the closed state, in which the seal pin is at a position closest to the opening.

In the liquid container manufacturing method according to the embodiment, before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

Figure 1:
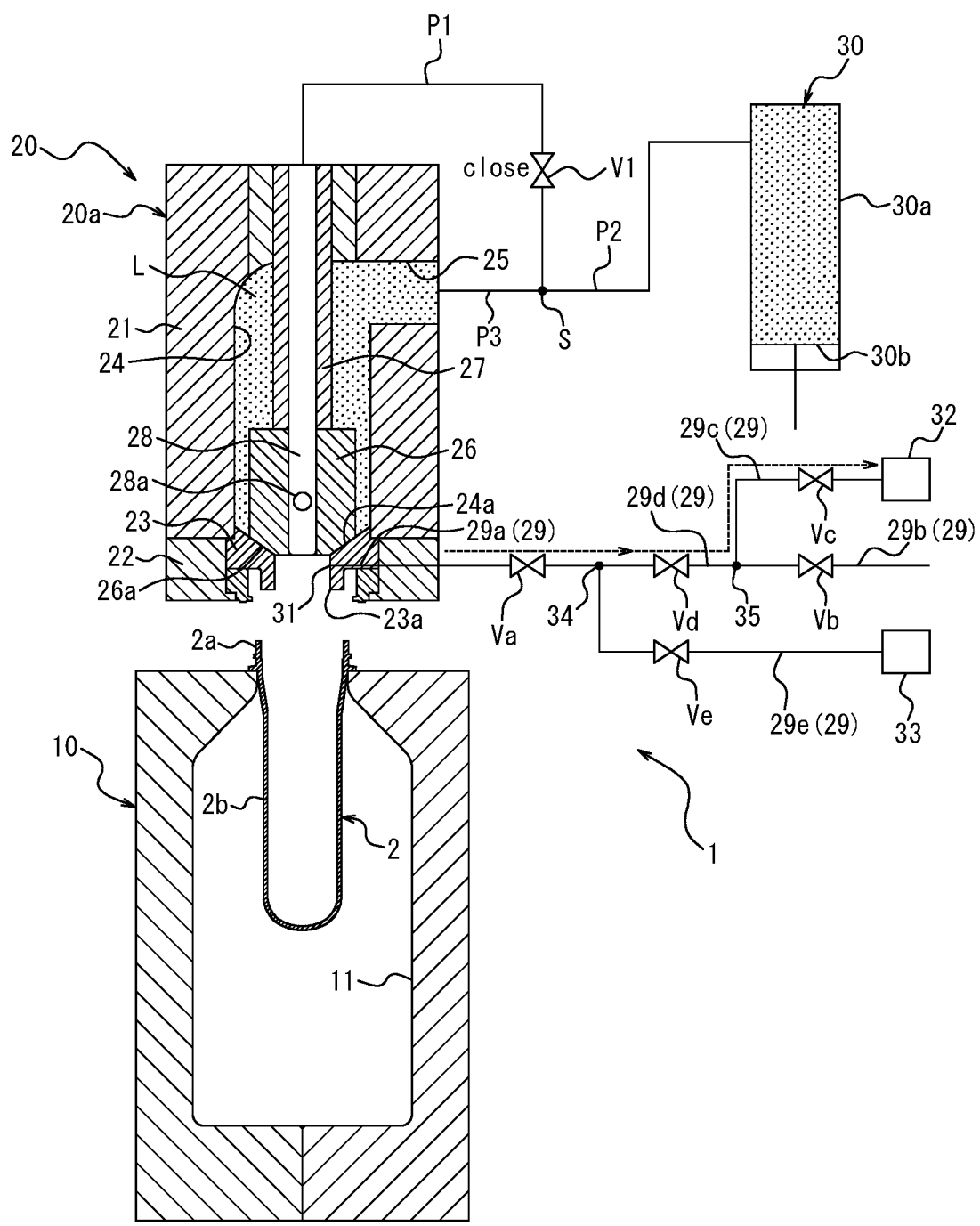
FIG. 1 illustrates an example of a liquid container manufacturing apparatus used for a liquid container manufacturing method according to an embodiment of the present disclosure in a standby step.

The liquid container manufacturing method according to the embodiment of the present disclosure may be implemented by using, for example, a liquid container manufacturing apparatus 1 which is configured as illustrated in FIG. 1.

A liquid container manufacturing apparatus according to an embodiment of the present disclosure includes:
a nozzle unit; and
a blow-molding mold, wherein
the nozzle unit includes:
a liquid supply path that is connected to a pressurized liquid supply source and that extends to a blow nozzle; and
a flow path that extends from an opening provided on an inner circumferential surface of the blow nozzle to an interior of the nozzle unit and that is configured to be opened and closed by a valve embedded in the blow nozzle, and
the flow path includes:
a communication space adjacent to the opening; and
a pin accommodating space which is adjacent to the communication space and in which a seal pin configured to make advancing and retracting movements along an axial direction is arranged, and wherein
the seal pin has a protruding portion configured to enter the communication space in a closed state of the valve,
the liquid container manufacturing apparatus being configured to
mold the preform into the liquid container having a shape conforming to an inner surface of the blow-molding mold, by supplying, through the liquid supply path to an interior of the preform, a pressurized liquid using the pressurized liquid supply source in a state in which the blow nozzle is engaged to a mouth of the preform.

The liquid container manufacturing apparatus 1 illustrated FIG. 1 manufactures, from a synthetic resin preform 2, a liquid container C (refer to FIG. 4) that contains a content liquid. Examples of liquids (i.e., content liquids) L which can be contained in the liquid container C may include a variety of liquids L, such as beverages, cosmetic products, pharmaceutical products, detergents, and toiletries including shampoo.

The preform 2 that can be used is, for example, a preform that has been formed by a thermoplastic resin material, such as polypropylene (PP) and polyethylene terephthalate (PET), in a closed-bottom tubular shape having a cylindrical-shaped mouth 2a, which serves as an opening end, a cylindrical-shaped trunk 2b, which is contiguous with the mouth 2a and which has a closed lower end.

Although not illustrated in details, the mouth 2a is provided, on an outer wall surface thereof, with an engagement protrusion which allows a closing cap (which is not illustrated) to be attached to the mouth 2a of the molded liquid container C by plugging (i.e., undercut engagement). Additionally, a male screw may also be provided on the outer wall surface of the mouth 2a instead of the engagement protrusion, and the closing cap may be attached to the mouth 2a by screw connection.

The liquid container manufacturing apparatus 1 includes a blow-molding mold 10. The blow-molding mold 10 has a cavity 11, which has a shape corresponding to a final shape, such as a bottle shape, of the liquid container C. The cavity 11 is open upward at an upper surface of the blow-molding mold 10. The preform 2 is placed in the blow-molding mold 10, with the trunk 2b being arranged inside the cavity 11 of the blow-molding mold 10 and with the mouth 2a protruding upward from the blow-molding mold 10.

The blow-molding mold 10 may be opened into left and right mold halves, and, by opening the blow-molding mold 10 into the left and right mold halves after molding the preform 2 into the liquid container C, the liquid container C may be removed from the blow-molding mold 10.

Above the blow-molding mold 10, there is provided a nozzle unit 20, which is configured to supply the pressurized liquid L into the preform 2. The nozzle unit 20 includes a body block 21.

The body block 21 is provided, in a lower end thereof, with a support block 22. The support block 22 supports a blow nozzle 23, which is attached to the lower end of the body block 21. The blow nozzle 23 is formed in substantially a cylindrical shape and has a lower end portion in which a liquid supply port 23a is defined. The body block 21, the support block 22, and the blow nozzle 23 constitute a nozzle unit body 20a. The nozzle unit body 20a is movable in a vertical direction relative to the blow-molding mold 10. When the nozzle unit body 20a descends to its lowermost stroke end, the nozzle unit body 20a (or, more concretely, the blow nozzle 23) comes into sealing engagement from above to the mouth 2a of the preform 2 which is placed in the blow-molding mold 10.

The nozzle unit body 20a (or, more concretely, the body block 21 and the blow nozzle 23) is provided, inside thereof, with a longitudinal flow path 24, which extends to the liquid supply port 23a of the blow nozzle 23. The longitudinal flow path 24 extends in the vertical direction.

The nozzle unit body 20a (or, more concretely, the body block 21) is provided with a supply port 25, which communicates to an upper end of the longitudinal flow path 24.

The nozzle unit body 20a (or, more concretely, the blow nozzle 23) includes a ring-shaped (annular-shaped) seat 24a, which is provided in the longitudinal flow path 24. The ring-shaped seat 24a is defined by an upper surface of the blow nozzle 23. The ring-shaped seat 24a may be defined by an inner circumferential surface of the blow nozzle 23 or may be defined by the upper surface and the inner circumferential surface of the blow nozzle 23. The ring-shaped seat 24a is formed by a conical-shaped surface tapering downward. The shape of the ring-shaped seat 24a may be, however, changed as appropriate. Inside the longitudinal flow path 24, there is arranged a sealing body 26, which is configured to open and close (the seat 24a of) the longitudinal flow path 24. The sealing body 26 is formed in a cylindrical shape and has a lower end provided with a tapered surface 26a, which has a conical shape tapering downward. When having moved to a closing position, that is, the lowermost stroke end position, the sealing body 26, at the tapered surface 26a, abuts against the upper surface (i.e., the seat 24a) of the blow nozzle 23 to thereby close (the seat 24a of) the longitudinal flow path 24. Although the tapered surface 26a is provided at the lower end of the sealing body 26, its arrangement may be changed as appropriate. Further, although the tapered surface 26a has the conical shape tapering downward, its shape may be changed as appropriate. On the other hand, when the sealing body 26 moves upward from the closing position, a lower end surface of the sealing body 26 lifts off from the upper surface (i.e., the seat 24a) of the blow nozzle 23 to thereby open (the seat 24a of) the longitudinal flow path 24.

The sealing body 26 is movable between the closing position in which (the seat 24a of) the longitudinal flow path 24 is closed and an opening position in which (the seat 24a of) the longitudinal flow path 24 is opened to a maximum degree of opening, that is, the maximum degree of opening in a liquid blow molding step. More specifically, the sealing body 26 is movable between the closing position (refer to FIG. 1), a preliminary opening position (refer to FIG. 2), and the opening position (refer to FIG. 4). In the preliminary opening position, the degree of opening of the sealing body 26 for opening and closing (the seat 24a of) the longitudinal flow path 24 is smaller than the degree of opening in the opening position. Preferably, an effective sectional area of the longitudinal flow path 24 in the preliminary opening position is not more than 10% of the effective sectional area of the longitudinal flow path 24 in the opening position. Note that the effective sectional area herein refers to the effective sectional area of a flow path defined between the sealing body 26 and the blow nozzle 23. As illustrated in FIG. 1, the sealing body 26 is fixed to a shaft body 27, which is provided in a manner such that the shaft body 27 is movable in the vertical direction relative to the nozzle unit body 20a, so that the sealing body 26 is movable in the vertical direction inside the longitudinal flow path 24. Additionally, the sealing body 26 may be formed integrally with the shaft body 27.

The nozzle unit 20 includes a discharge rod 28 provided with a discharge port 28a. The discharge rod 28, which is formed in a substantially cylindrical shape from a steel material or the like, extends along an axial center of the shaft body 27 and the sealing body 26. The discharge rod 28 may be driven by a driving source which is not illustrated and is movable in the vertical direction relative to the shaft body 27 and the sealing body 26. The discharge port 28a communicates with a first pipe P1 via a hollow (which is not illustrated) in the discharge rod 28. More specifically, the hollow in the discharge rod 28 has a lower end portion that communicates with the discharge port 28a, and the hollow in the discharge rod 28 has an upper end portion that communicates with the first pipe P1. The first pipe P1 is provided with a rod valve V1, which is configured to open and close the first pipe P1. Additionally, the rod valve V1 is preferably configured by a solenoid valve that may be controlled by a control apparatus. In the present embodiment, the discharge rod 28 has a closed lower end, and the discharge port 28a is provided on a circumferential wall of the discharge rod 28. Accordingly, when the discharge rod 28 is returned to the original position after a headspace HS (refer to FIG. 7) is formed in the container C, liquid-dripping is unlikely to occur. The present disclosure, however, is not limited to the above configuration, and the discharge port 28a may be provided on a lower end surface of the discharge rod 28, or may be provided on both the lower end surface and the circumferential wall of the discharge rod 28.

The discharge rod 28 may be used as a stretching rod as in the present embodiment. By moving downward, the discharge rod 28 stretches the preform 2 in an axial direction.

Figure 2:
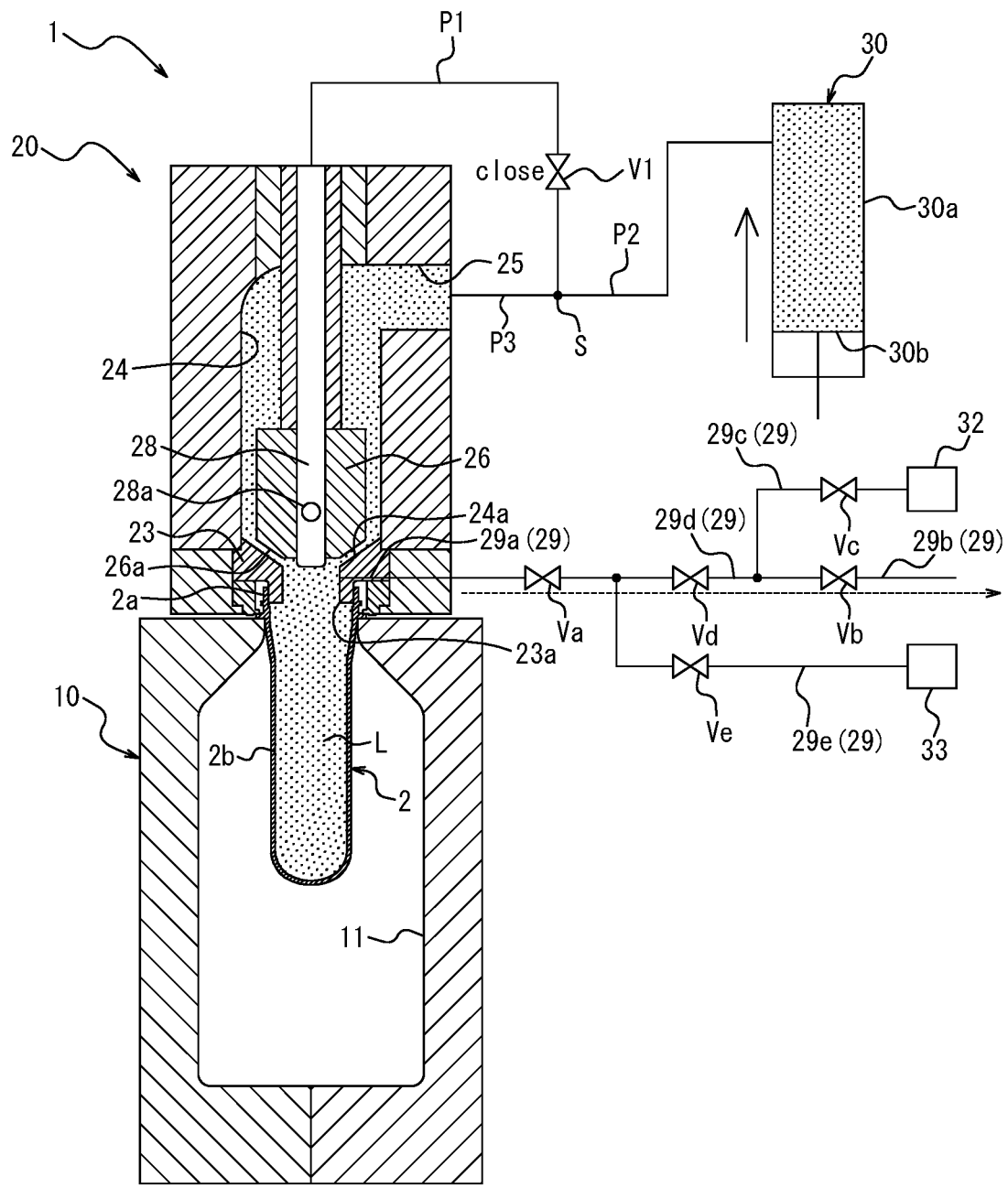
FIG. 2 illustrates the liquid container manufacturing apparatus in an air discharge step.
Figure 3:
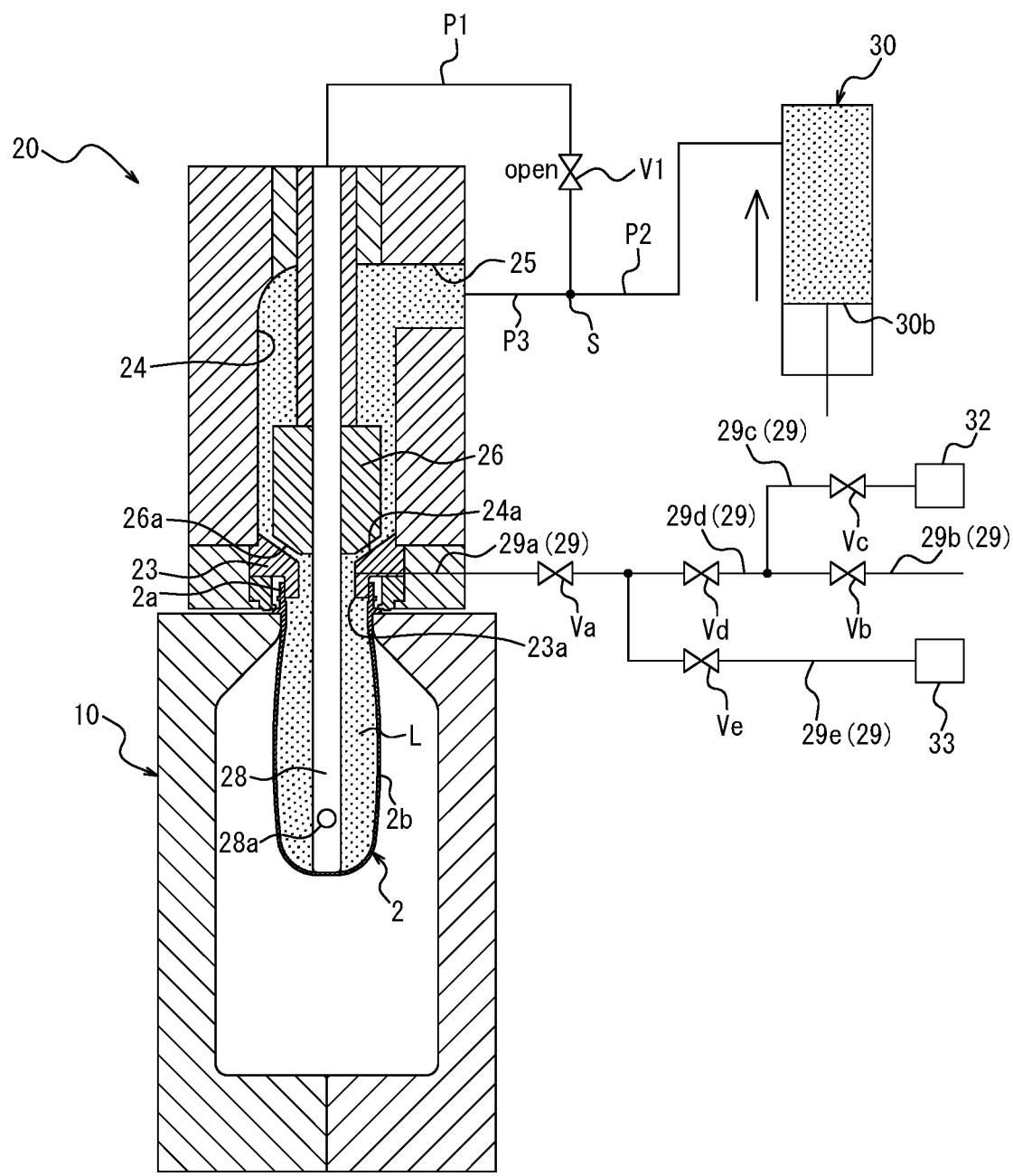
FIG. 3 illustrates the liquid container manufacturing apparatus in a rod purging step and a liquid blow molding step.
Figure 4:
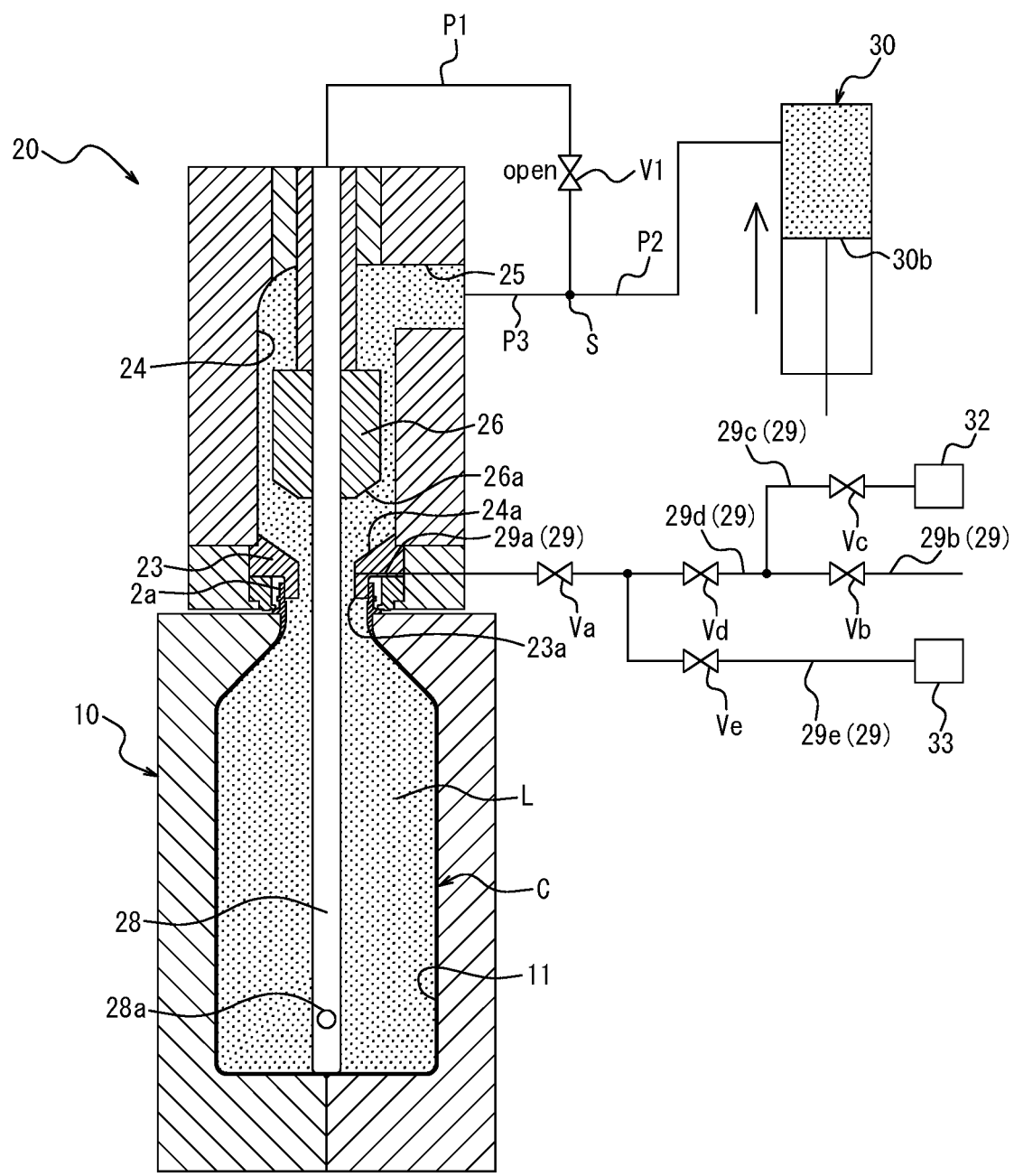
FIG. 4 illustrates the liquid container manufacturing apparatus upon completion of the liquid blow molding step.
Figure 7:
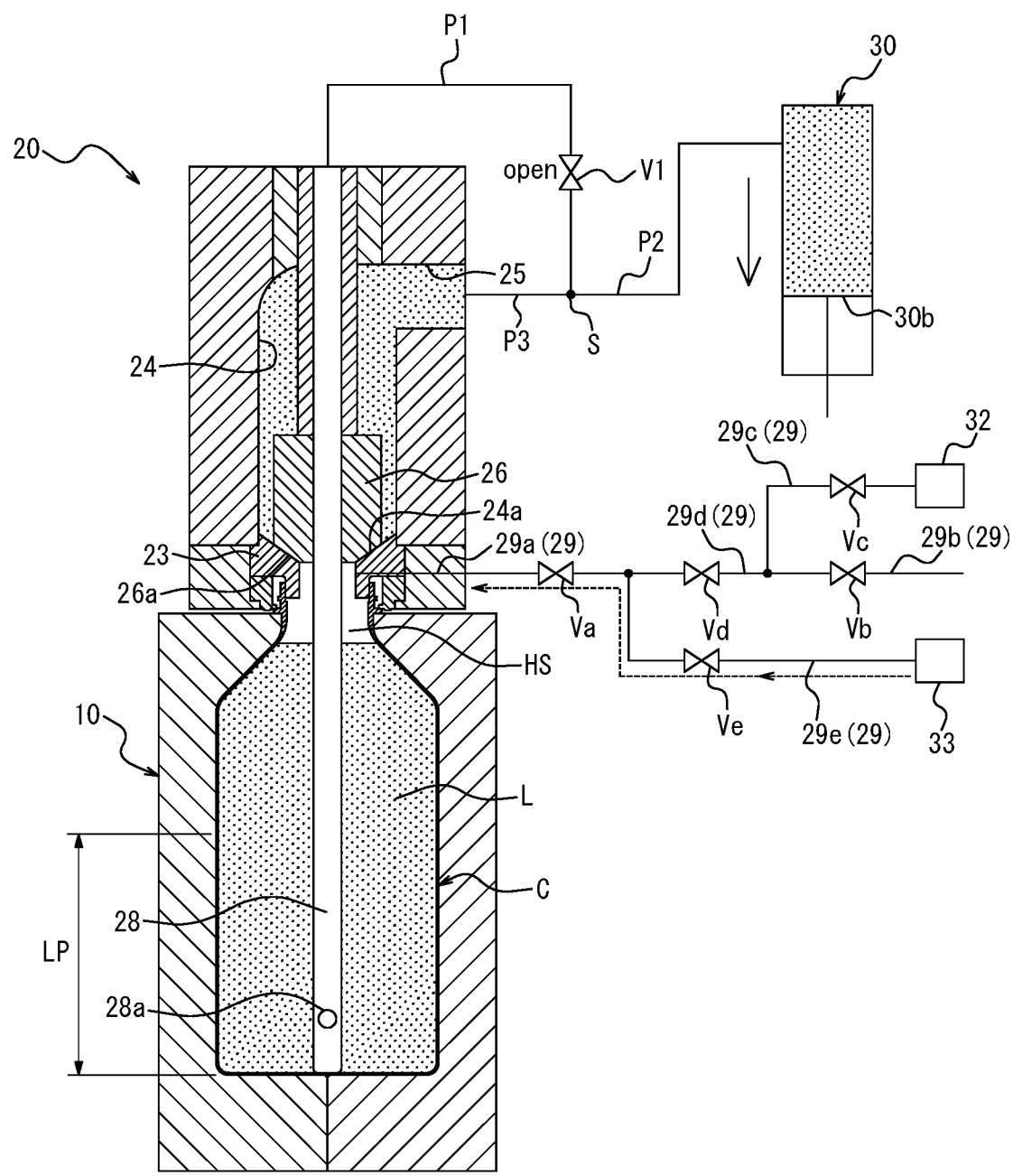
FIG. 7 illustrates the liquid container manufacturing apparatus when a second stage of suck-back is started from a state illustrated in FIG. 6 and a headspace is being formed in the headspace forming step.
Figure 8:
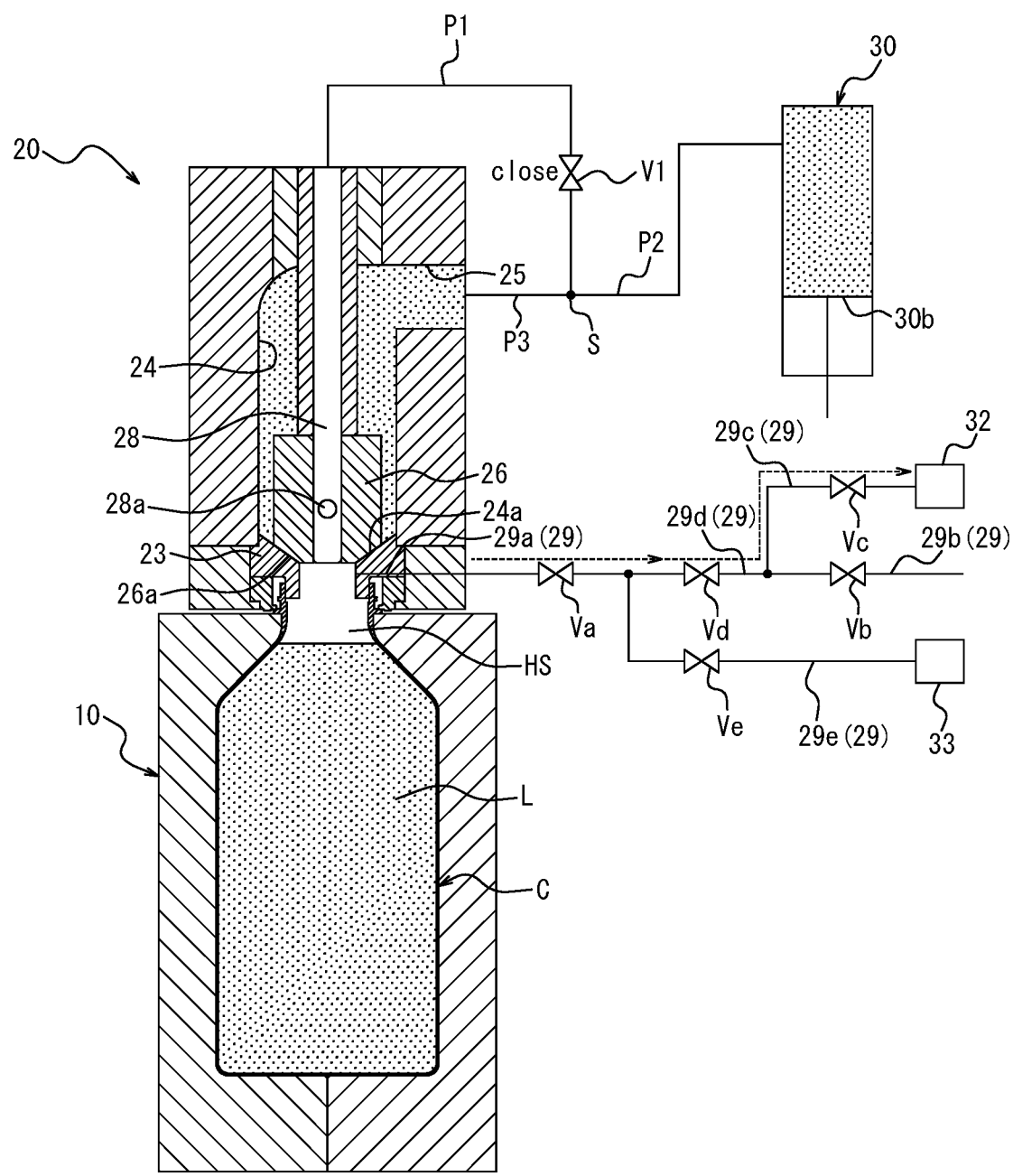
FIG. 8 illustrates the liquid container manufacturing apparatus in a rod-ascending and depressurizing step.

Inside (the nozzle unit body 20a of) the nozzle unit 20, there is provided a flow path 29 through which the liquid L and/or a gas (e.g., air in this embodiment) flow(s). The flow path 29 is configured to be alternatively brought into a drawing state in which an opening 31, which is provided in a portion in a later-described supply path (the supply path being formed by a third pipe P3, the supply port 25, and the longitudinal flow path 24) that is located on a downstream side of the seat 24a (e.g., on the inner circumferential surface of the blow nozzle 23 in this embodiment), is connected to a drawing source 32, a pressurized state in which the opening 31 is connected to a pressurized gas supply source 33, which is configured to supply a pressurized gas (e.g., air in this embodiment), or a closed state in which the opening 31 is blocked from any of the drawing source 32, the pressurized gas supply source 33, and the atmosphere, in a selectable manner. The opening 31 is open to the liquid supply port 23a. As illustrated in FIGS. 1 and 8, by bringing the flow path 29 into the drawing state, the content liquid adhered to or remaining in the blow nozzle 23 when the blow nozzle 23 has ascended may be drawn, whereby liquid-dripping from the blow nozzle 23 may be prevented. When the content liquid is unlikely to drip or when the dripping may be tolerated, for example, the flow path 29 does not need to be brought into the drawing state (and a third path 29c and the drawing source 32 may be omitted). As illustrated in FIG. 2, by bringing the flow path 29 into an exposed-to-atmosphere state, in an air discharge step, air in an interior of the preform 2 may be discharged to the atmosphere (i.e., outside) through the flow path 29. Depending on conditions, in the air discharge step, the path 29 may also be brought into the drawing state instead of the exposed-to-atmosphere state, to thereby discharge the air from the interior of the preform 2. As illustrated in FIGS. 3 and 4, by bringing the flow path 29 into the closed state, in the liquid blow molding step, the pressurized liquid L may be stably supplied to the interior of the preform 2. As illustrated in FIG. 7, by bringing the flow path 29 into the pressurized state, when the liquid L is discharged from the interior of the liquid container C through the discharge port 28a of the discharge rod 28 in a headspace forming step, the discharge of the liquid L may be accelerated or assisted (air-assisted) by supplying the pressurized gas (e.g., air) to the interior of the liquid container C. The drawing source 32 may be configured by, for example, a drawing pump or the like. The pressurized gas supply source 33 may be configured by, for example, a pressurizing pump or the like. The drawing source 32 and the pressurized gas supply source 33 may be configured by a drawing/pressurizing pump in which a drawing pump and a pressurizing pump are integrated (e.g., a plunger pump like a pressurized liquid supply source 30). A part or an entirety of the flow path 29 may be provided inside (the nozzle unit body 20a of) the nozzle unit 20.

In the present embodiment, as illustrated in FIG. 1, the flow path 29 includes a first path 29a in which a first valve Va (valve) is provided, a second path 29b in which a second valve Vb is provided, the third path 29c in which a third valve Vc is provided, a fourth path 29d in which a fourth valve Vd is provided, and a fifth path 29e in which a fifth valve Ve is provided. The first path 29a has one end connected to the opening 31, and has another end connected to a first branching portion 34. The second path 29b has one end connected to a second branching portion 35, and has another end exposed to the atmosphere. The third path 29c has one end connected to the second branching portion 35, and has another end connected to the drawing source 32. The fourth path 29d has one end connected to the first branching portion 34, and has another end connected to the second branching portion 35. The fifth path 29e has one end connected to the first branching portion 34, and has another end connected to the pressurized gas supply source 33. Each of the first through the fifth valve Va through Ve is preferably configured by a solenoid valve.

The pressurized liquid supply source 30 is connected to the supply port 25 through the third pipe P3 and a second pipe P2. The pressurized liquid supply source 30 may be configured, for example, by a plunger pump including a cylinder 30a and a piston (e.g., plunger) 30b.

As illustrated in FIGS. 3 and 4, by operating in a positive direction (i.e., pressurizing direction) in a state in which the blow nozzle 23 is in sealing engagement to the mouth 2a of the preform 2 placed in the blow-molding mold 10 and in which the sealing body 26 opens the longitudinal flow path 24, the pressurized liquid supply source 30 may supply the pressurized liquid L to the interior of the preform 2 via the second pipe P2, the third pipe P3, the supply port 25, (the seat 24a of) the longitudinal flow path 24, and the liquid supply port 23a. The second pipe P2 splits into the first pipe P1 and the third pipe P3 at a branching portion S. The nozzle unit 20 includes a common path that is formed by the second pipe P2 extending from the pressurized liquid supply source 30 to the branching portion S, the supply path that is formed by the third pipe P3 extending from the branching portion S to the supply port 25, the supply port 25, and the longitudinal flow path 24, and a discharge path (including the first pipe P1) that extends from the branching portion S to the discharge port 28a provided in the discharge rod 28.

As illustrated in FIG. 7, by operating in an opposite direction in a state in which the sealing body 26 closes the longitudinal flow path 24 and in which the rod valve V1, which is arranged in the first pipe P1, is opened, the pressurized liquid supply source 30 may discharge the liquid L from the interior of the liquid container C into the discharge path extending from the discharge port 28a to the branching portion S through the discharge port 28a of the discharge rod 28.

By operating in the opposite direction in a state in which the sealing body 26 closes the longitudinal flow path 24 and in which the rod valve V1 is closed, the pressurized liquid supply source 30 may draw the liquid L contained in a supply tank which is not illustrated into the cylinder 30a, so as to prepare for the next liquid blow molding.

Operations of the nozzle unit body 20a, the sealing body 26, the discharge rod (i.e., stretching rod) 28, the pressurized liquid supply source 30 (i.e., plunger 30b), the rod valve V1, the first through the fifth valve Va through Ve, the drawing source 32, the pressurized gas supply source 33, or the like are subject to integrated control by the control apparatus which is not illustrated.

Next, a method for molding, from the synthetic resin preform 2, the liquid container C in which the liquid (i.e., content liquid) L is contained in a container having a predetermined shape using the liquid container manufacturing apparatus 1 with the above configuration (i.e., a liquid container manufacturing method according to the present embodiment) will be described.

Firstly, a standby step is performed. In the standby step, a preform 2 which has been heated in advance to a predetermined temperature (e.g., 80° C. to 150° C.) around which stretchability is achieved using a heating device (which is not illustrated), such as a heater, is placed in the blow-molding mold 10, and the blow-molding mold 10 is closed.

At this time, as illustrated in FIG. 1, the nozzle unit 20 is positioned above and off the blow-molding mold 10, and the sealing body 26 closes the seat 24a. Further, the flow path 29 is in the drawing state. More specifically, the first valve Va is opened, the second valve Vb is closed, the third valve Vc is opened, the fourth valve Vd is opened, and the fifth valve Ve is closed. At this time, since the mouth 2a of the preform 2 is opened, the preform 2 is filled with air.

Next, in the present embodiment, the air discharge step is performed. In the air discharge step, as illustrated in FIG. 2, the nozzle unit 20 is caused to descend to engage the blow nozzle 23 to the mouth 2a of the preform 2, and the flow path 29 is brought into the exposed-to-atmosphere state. In this state, the sealing body 26 is brought into the preliminary opening position, and the plunger 30b is operated at a first rate (i.e., at a first pressure) in the positive direction to supply the liquid L to the interior of the preform 2 through the longitudinal flow path 24 (in the supply path), so that air in the interior of the preform 2 is discharged to the atmosphere (i.e., outside) through the flow path 29. That is, by supplying the liquid L to the interior of the preform 2, a majority of air filled in the interior of the preform 2 is pushed out to the outside by the liquid L and so discharged. At this time, in the flow path 29, the first valve Va is opened, the second valve Vb is opened, the third valve Vc is closed, the fourth valve Vd is opened, and the fifth valve Ve is closed. Additionally, the first rate in the air discharge step is preferably set to a level that does not substantially allow the preform to be stretched (or expanded).

Upon completion of the air discharge step, the liquid blow molding step is then performed. In the liquid blow molding step, in a state in which the blow nozzle 23 is engaged to the mouth 2a of the preform 2, the pressurized liquid L is supplied into the preform 2 by the pressurized liquid supply source 30 through the longitudinal flow path 24 (in the supply path). Consequently, the preform 2 is molded into the liquid container C which has a shape conforming to the cavity 11 of the blow-molding mold 10.

As illustrated in FIG. 3, in the present embodiment, at beginning of the liquid blow molding step, a rod purging step is performed first. In the rod purging step, firstly, the flow path 29 is brought into the closed state, and the rod valve V1 is opened, and subsequently, the plunger 30b is operated in the positive direction at a second rate (that is, at a second pressure greater than the first pressure) while the sealing body 26 is maintained in the preliminary opening position, and the liquid L is discharged through the discharge port 28a of the discharge rod 28 to the liquid L in the interior of the preform 2 prior to the molding and/or in the course of the molding into the liquid container C. In the present embodiment, in the rod purging step and in the liquid blow molding step, all the first through the fifth valve Va through Ve are closed. The third valve Vc, however, may be opened in advance in preparation for a rod-ascending and depressurizing step. Further, the fifth valve Ve may be opened in advance in preparation for a second stage of suck-back in the headspace forming step.

Sometimes, a slight amount of air is entrapped into the liquid L that has been discharged through the discharge port 28a of the discharge rod 28 in the last headspace forming step, due to, for example, a process of vertical movement by the discharge rod 28. If the air is returned to the longitudinal flow path 24 (in the supply path) and accumulated each time the container C is molded, stability of the molding conditions (such as a pressure to which the liquid L is pressurized at the time of the liquid blow molding), moldability of the container, or the like may be deteriorated. The accumulation of the air may be prevented by the aforementioned rod purging step of discharging, to the interior of the preform 2, (preferably, an entire amount of) the liquid L that has been discharged through the discharge port 28a of the discharge rod 28 in the last headspace forming step. Additionally, in the aforementioned rod purging step, since the amount of the air supplied into the preform 2 is only small, an impact on moldability can be ignored. In the rod purging step, the discharge of the liquid L through the discharge port 28a is performed in the liquid L in the interior of the preform 2. The occurrence of bubbling in the preform 2, may be therefore prevented.

Although in the present embodiment the rod purging step is performed by operating the plunger 30b in the positive direction at the second rate while the sealing body 26 is maintained in the preliminary opening position, the plunger 30b may also be operated in the positive direction at the second rate while the sealing body 26 is being moved to the opening position or after the sealing body 26 is moved to the opening position. Further, to achieve a more stable discharge through the discharge port 28a in the rod purging step, it is preferable to move the sealing body 26 to the closing position before opening the rod valve V1 and operating the plunger 30b in the positive direction (for example, at the second rate). Alternatively, an opening/closing valve may be provided in the third pipe P3, and the plunger 30b may be operated in the positive direction (for example, at the second rate), while the opening/closing valve is closed and while the rod valve V1 is opened (at this time, the sealing body 26 may be maintained in the preliminary opening position or may be moved to the opening position).

In the liquid blow molding step, once the rod purging step is completed, subsequently the sealing body 26 is caused to ascend from the preliminary opening position toward the opening position while the plunger 30b remains operated in the positive direction at the second rate, to thereby supply the liquid L pressurized to the second pressure to the interior of the preform 2 through the longitudinal flow path 24 (in the supply path) via the seat 24a. Consequently, as illustrated in FIG. 4, the preform 2 is molded into the liquid container C having the shape conforming to the cavity 11 of the blow-molding mold 10. Additionally, in the blow step following the completion of the rod purging step, the rod valve V1 may be closed, although the rod valve V1 is opened in FIGS. 3 and 4.

Herein, the liquid blow molding step is performed in a state in which the majority of the air in the interior of the preform 2 has been discharged to the outside by the air discharge step, when the pressurized liquid L is supplied to the interior of the preform 2, the liquid L is not entrained with air, and thus, the entrapment of air into the liquid L in the interior of the liquid container C is prevented.

In the present embodiment, as illustrated in FIGS. 3 and 4, a rod stretching step is performed in the course of the liquid blow molding step. In the rod stretching step, the trunk 2b of the preform 2 is stretched in the axial (i.e., longitudinal) direction by the stretching rod 28 which is configured to make a downward advance movement. The rod stretching step may also be performed prior to the liquid blow molding step. Performing the liquid blow molding step after or in the course of the rod stretching step (it is to be noted that the rod stretching step may be started after the start of the liquid blow molding step) allows biaxial stretch blow molding in which the preform 2 is blow molded while being stretched in the axial direction by the stretching rod 28, thereby permitting the preform 2 to be molded into the liquid container C with the predetermined shape with even higher accuracy. The liquid blow molding step may be, however, performed without performing the rod stretching step. FIG. 1 illustrates a state in which the stretching rod 28 is in an original position. The lower end surface of the stretching rod 28, in the original position, does not need to be positioned at the same height as the lower end surface of the sealing body 26 as illustrated in FIG. 1, and may be positioned above or below the height.

Figure 5:
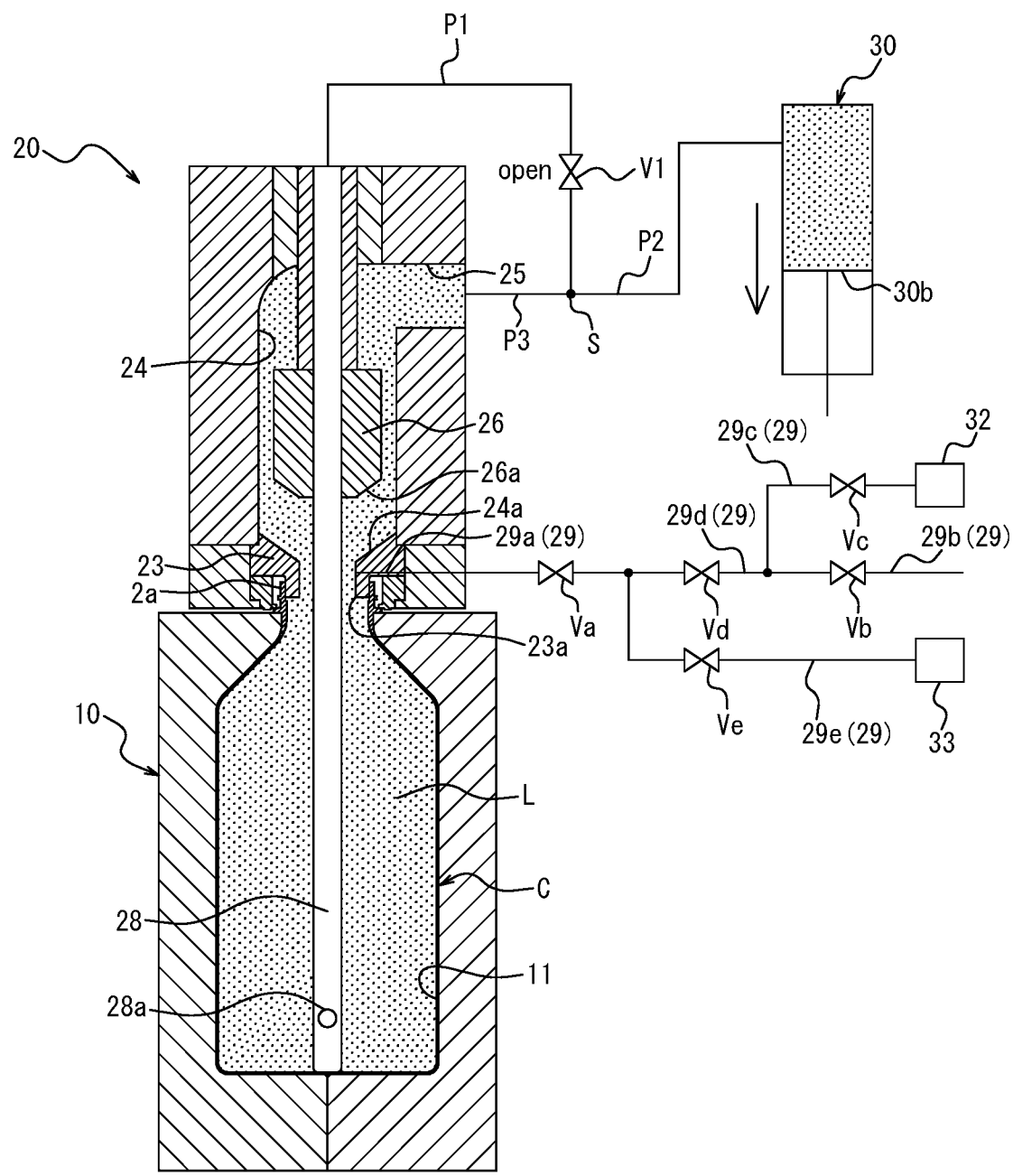
FIG. 5 illustrates the liquid container manufacturing apparatus when a first stage of suck-back is being performed in a headspace forming step.

Once the liquid blow molding step is completed, the headspace forming step is subsequently performed. As illustrated in FIG. 5, in the present embodiment, in the headspace forming step, a first stage of suck-back is performed first (that is, the liquid L is discharged from the interior of the liquid container C through the supply path by operating the pressurized liquid supply source 30 in the drawing direction). In the first stage of suck-back, as illustrated in FIG. 5, the sealing body 26 is in the opening position, the flow path 29 is in the closed state, and the rod valve V1 remains opened (it is to be noted that the rod valve V1 may also be closed), the plunger 30b is operated in the opposite direction (i.e., drawing direction) by a predetermined operation amount, and a predetermined amount of the liquid L is sucked back from the interior of the molded liquid container C into the longitudinal flow path 24 (in the supply path). By the first stage of suck-back, a positive pressure state in the interior of the container C may be cancelled (or may even be brought into a negative pressure state), thereby preventing the liquid L from entering the flow path 29 from the interior of the container C when the flow path 29 is brought into the pressurized state later. Further, by performing the first stage of suck-back through the longitudinal flow path 24 (in the supply path), the liquid L may be discharged more quickly than when the first stage of suck-back is performed only through the discharge port 28a of the discharge rod 28, whereby the positive pressure state in the interior of the container C may be promptly cancelled. The amount to be sucked back in the first stage of suck-back is preferably within an amount small enough to prevent the slight amount of air entrapped into the liquid L in the interior of the molded container C from being returned to the longitudinal flow path 24 (supply channel) as much as possible.

Figure 6:
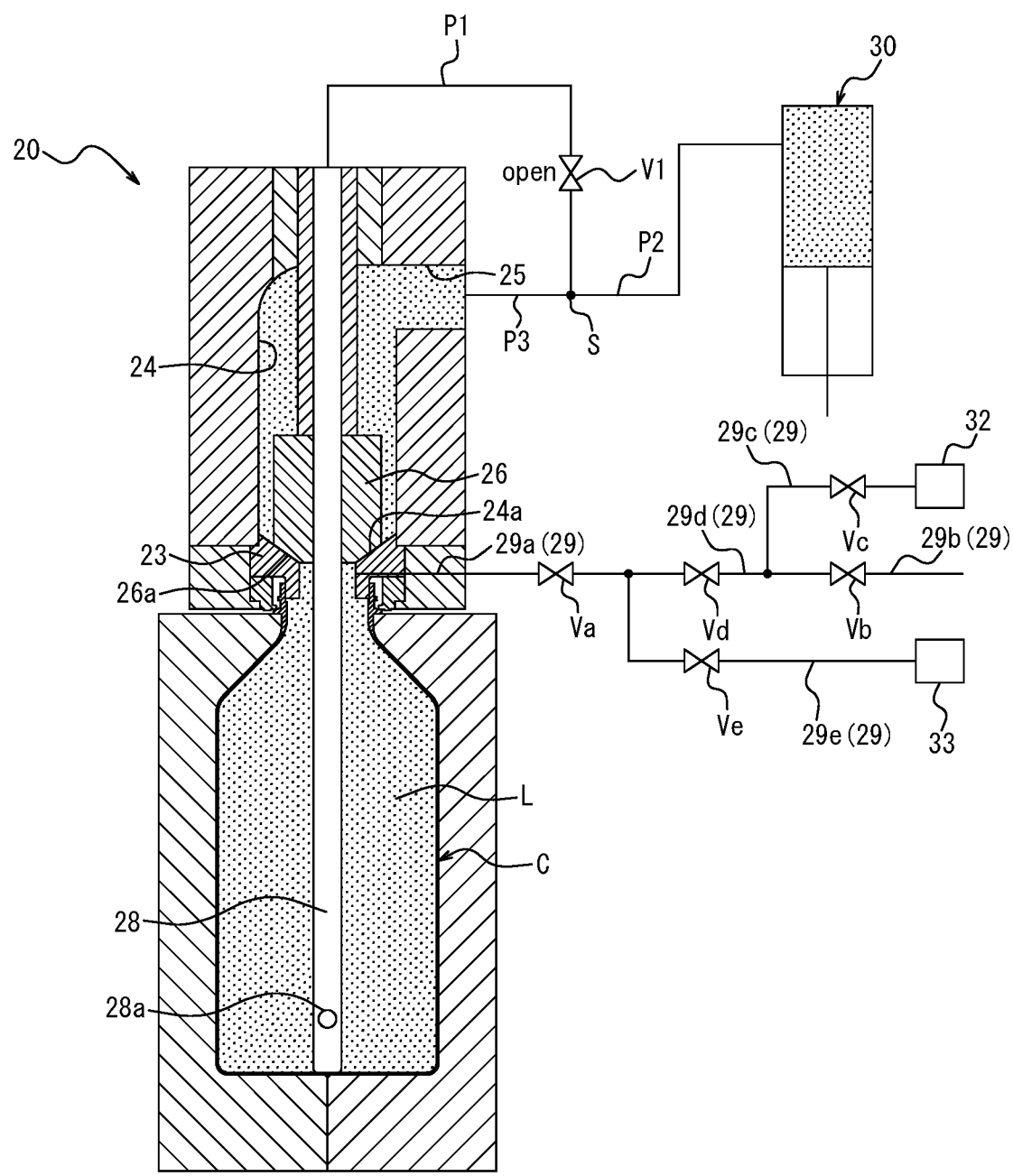
FIG. 6 illustrates the liquid container manufacturing apparatus when a supply path is closed from a state illustrated in FIG. 5 in the headspace forming step.

In the headspace forming step according to the present embodiment, once the first stage of suck-back is completed, the sealing body 26 is moved to the closing position (refer to FIG. 6), the flow path 29 is brought into the pressurized state, and a second stage of suck-back is performed (refer to FIG. 7). More specifically, as illustrated in FIG. 7, in the flow path 29, the first valve Va is opened, the second valve Vb is closed, the third valve Vc is closed, the fourth valve Vd is closed, and the fifth valve Ve is opened. The third valve Vc may be, however, opened in advance in preparation for the rod-ascending and depressurizing step. In the second stage of suck-back, the rod valve V1 is opened, and the (plunger 30b of) the pressurized liquid supply source 30 is operated in the drawing direction in a state in which the longitudinal flow path 24 (in the supply path) is closed, to thereby discharge the liquid L from the interior of the liquid container C through the discharge port 28a provided in the discharge rod 28 extending to the interior of the liquid container C through the blow nozzle 23, so that the headspace HS will be formed in the liquid container C. In the present embodiment, the second stage of suck-back is performed while the pressurized gas is being supplied to the interior of the liquid container C through the flow path 29, and therefore, the discharge of the liquid L through the discharge port 28a is accelerated. The assist by the pressurized gas is effective especially when the liquid L as the content liquid has a high viscosity. When it is possible to discharge the liquid L from through discharge port 28a without the assist by the pressurized gas, such as when the viscosity of the liquid L as the content liquid is low, the second stage of suck-back may be performed after the flow path 29 is brought into the exposed-to-atmosphere state (or, the blow nozzle 23 is disengaged from the mouth 2a of the container C, so that the atmosphere can be introduced from the outside). In a case in which the second stage of suck-back is thus performed while the gas is being introduced into the interior of the liquid container C, the headspace HS of a greater volume can be formed without causing the container C to undergo deformation (permanent deformation) due to an excessively negative pressure, compared with a case in which the flow path 29 is closed and a negative pressure is produced in the interior of the container C by the second stage of suck-back, and subsequently, the flow path 29 is brought into the exposed-to-atmosphere state so as to form the headspace HS. It is, however, possible to close the flow path 29 and produce the negative pressure in the interior of the container C by the second stage of suck-back, and subsequently, bring the flow path 29 into the exposed-to-atmosphere state so as to form the headspace HS. In this case, the second stage of the suck-back may be performed concurrently (or may be staggered, allowing partial overlap) with the first stage of suck-back. Further, the headspace HS may also be formed by, instead of performing the second stage of suck-back, discharging the liquid L through the discharge port 28a by using only the pressurized gas supplied through the flow path 29 (that is, by discharging the liquid L from the interior of the liquid container C through the discharge port 28a of the discharge rod 28, by introducing the pressurized gas into the interior of the liquid container C in a state in which the supply path is closed, without operating the pressurized liquid supply source 30 in the drawing direction).

By discharging the liquid L through the discharge port 28a as in the present embodiment, the liquid L of a desired amount may be discharged from the liquid, especially from a lower portion of the liquid with a lower level of air entrapment compared with a case in which the liquid L is discharged through (the seat 24a of) the longitudinal flow path 24. Accordingly, when the rod purging step is performed, it is not necessary in the rod purging step to return the entire amount of the liquid L that has been discharged through the discharge port 28a (it is sufficient to return the amount of the liquid L in which air entrapment is probable). Specifically, in the present embodiment, as illustrated in FIG. 7, the liquid L is discharged from the interior of the liquid container C through the discharge port 28a positioned at a lower half portion LP of the liquid container C (i.e., a lower side portion when the height is vertically divided into two equal parts) with the lower level of air entrapment. Alternatively, the liquid L may also be discharged from the interior (liquid) of the liquid container C through the discharge port 28a that is positioned at an upper half portion of the liquid container C instead. The discharging port 28a may be provided in plurality in the discharging rod 28 along the axial direction and/or a circumferential direction. The arrangement position, number, shape, etc. of each discharge port 28a can be appropriately determined in accordance with the type, nature, etc. of the liquid L.

Further, in the headspace forming step, the amount of the liquid L discharged from the interior of the liquid container C through the discharge port 28a is less than or equal to an internal volume of the discharge path. This may prevent the discharged liquid L, along with air, from being entrapped into the supply path (i.e., the longitudinal flow path 24, the supply port 25, and the third pipe P3). From the above perspective, the amount of the liquid L discharged from the interior of the liquid container C through the discharge port 28a in the headspace forming step is preferably less than or equal to the internal volume of a portion in the discharge path that extends from the discharge port 28a to the rod valve V1. Further, according to the present embodiment, the pressurized liquid supply source 30 configured to pressurize the supply path can also be used for the purpose of the discharge, so as to simplify the configuration of the nozzle unit 20. The amount of the liquid L discharged from the interior of the liquid container C through the discharge port 28a in the headspace forming step may be, however, greater than the internal volume of the discharge path.

In the present embodiment, once the headspace forming step is completed, the rod-ascending and depressurizing step is performed. In the rod-ascending and depressurizing step, as illustrated in FIG. 8, the discharge rod (stretching rod) 28 is caused to ascend and returned to the original position. Further, the flow path 29 is brought into the drawing state, and the rod valve V1 is closed. After that, the nozzle unit 20 is caused to ascend, and the liquid container C is removed from the blow-molding mold 10. Then, the pressurized liquid supply source 30 is filled, and the processing moves to the standby step illustrated in FIG. 1.

Figure 9:
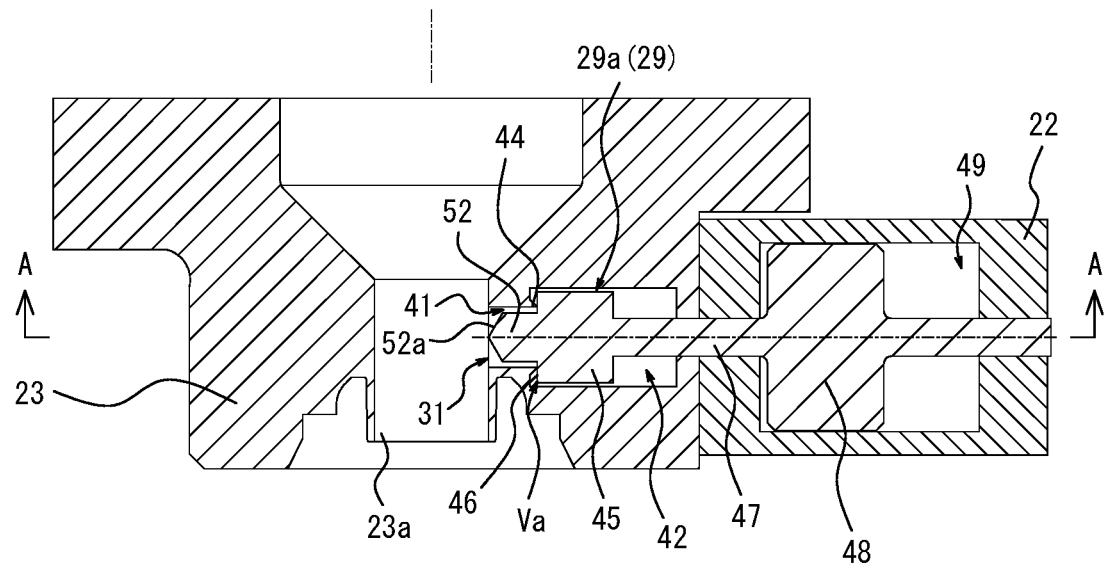
FIG. 9 is a sectional view, seen from a side direction, illustrating a valve embedded in a blow nozzle of the liquid container manufacturing apparatus illustrated in FIG. 1 in an enlarged manner.
Figure 10:
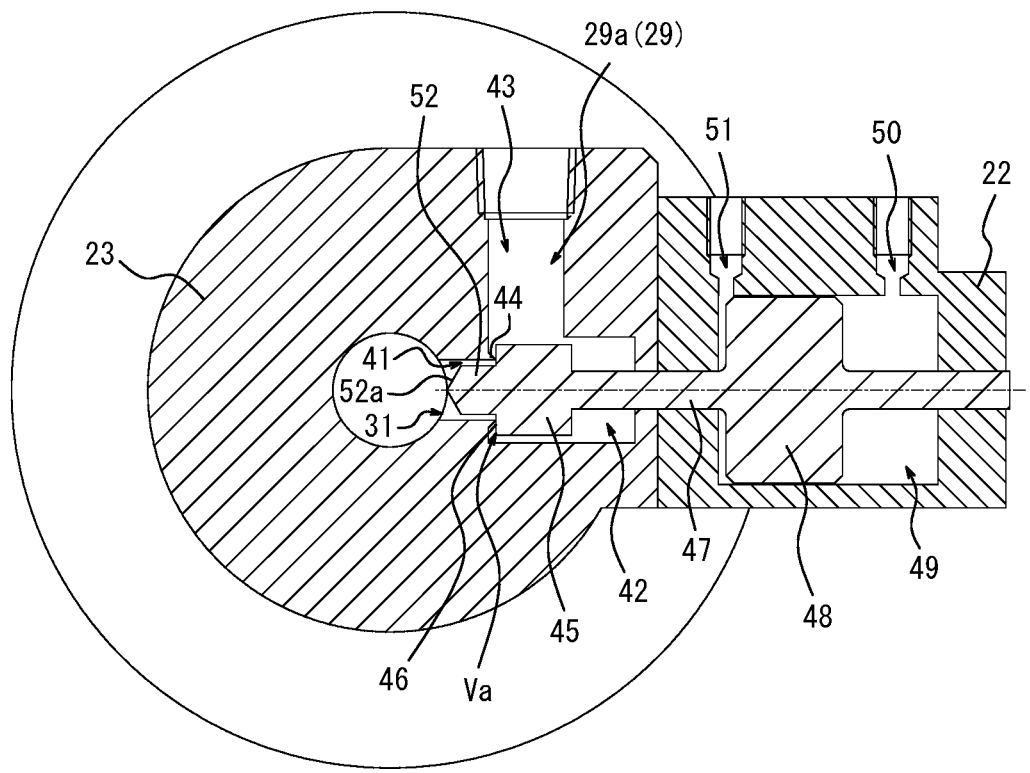
FIG. 10 is a sectional view taken along a line A-A of FIG. 9.

Here, the first valve Va in the present embodiment will be described in more detail. Although schematically illustrated in FIGS. 1 through 8, the first valve Va in the present embodiment is embedded in the blow nozzle 23 as illustrated in FIGS. 9 and 10.

The first valve Va is provided in the first path 29a, in the flow path 29 provided inside the nozzle unit 20, that connects the opening 31 provided on the inner circumferential surface of the blow nozzle 23 to the first branching portion 34 (refer to FIG. 1).

In a portion of the first path 29a that is formed inside the blow nozzle 23, there are provided a communication space 41 that is adjacent to the opening 31, and a pin accommodating space 42 that is adjacent to the communication space 41. The communication space 41 may be a cylindrical-shaped space extending linearly between the opening 31 and the pin accommodating space 42 along a direction of advancing and retracting movements (in this embodiment, a direction [i.e., horizontal direction] perpendicular to the vertical direction) of a seal pin 45 which will be described later. Note that the direction of advancing and retracting movements of the seal pin 45 is referred to as an "axial direction".

The pin accommodating space 42 extends in the same direction as the communication space 41 and may be a cylindrical-shaped space having a diameter greater than that of the communication space 41. The shape and extending direction of each of the communication space 41 and the pin accommodating space 42 are not limited to the illustrated example and can be appropriately changed.

As illustrated in FIG. 10 illustrating an A-A section of FIG. 9, the blow nozzle 23 is provided with a connection port 43, which communicates with the pin accommodating space 42 in a direction perpendicular to the pin accommodating space 42. The connection port 43 constitutes a part of the first path 29a and is connected to the first branching portion 34. The connection port 43 does not necessarily need to be orthogonal to the pin accommodating space 42.

The pin accommodating space 42 has an end portion (e.g., a stepped portion in the illustrated example) communicating with the communication space 41, and a ring-shaped (annular-shaped) seal seat 44 is provided there. The seal seat 44 in this embodiment is configured by a tapered protrusion projecting in a direction away from the opening 31. Additionally, the shape of the seal seat 44 is not limited to the illustrated example and may be, for example, an annular-shaped flat surface perpendicular to the direction of advancing and retracting movements of the later-described seal pin 45. Alternatively, the seal seat 44 may be an inclined surface whose diameter gradually increases as it is away from the opening 31, and in this case, a later-described seal surface 46 of the seal pin 45 is also preferably configured by an inclined surface whose diameter gradually increases as it is away from the opening 31.

Inside the pin accommodating space 42 in the first path 29a, the seal pin 45 is arranged along an axis of the first path 29a. The seal pin 45 is configured to make advancing and retracting movements along the axial direction. The seal pin 45 is formed in a cylindrical shape having a diameter smaller than that of the pin accommodating space 42, and has the annular seal surface 46 which is configured to abut against the seal seat 44 to thereby close the first path 29a. The seal surface 46 in this embodiment is configured by an annular-shaped flat surface perpendicular to the axial direction of the seal pin 45. Thus, the first valve Va in this embodiment is constituted by the seal seat 44 and the seal surface 46.

The seal pin 45 is integrally provided with a piston 48, which has a diameter greater than that of the seal pin 45, via a shaft 47. The piston 48 is arranged inside a cylinder chamber 49 provided in the support block 22, and is movable along the axial direction within the cylinder chamber 49. Further, the support block 22 is provided with a closed-side port 50 communicating with a rear end side of the cylinder chamber 49 that is away from the opening 31, and is also provided with an open-side port 51 communicating with a front end side of the cylinder chamber 49 that is close to the opening 31.

By supplying a pressurized medium, such as compressed air, to an interior of the cylinder chamber 49 through the closed-side port 50, the piston 48 is caused to make an advancing movement toward the opening 31, so that the seal surface 46 of the seal pin 45 comes into abutment against the seal seat 44 to thereby bring the first valve Va into the closed state. Conversely, by supplying the pressurized medium, such as compressed air, to the interior of the cylinder chamber 49 through the open-side port 51, the piston 48 is caused to make a retracting movement toward a direction away from the opening 31, so that the seal surface 46 is spaced from the seal seat 44 to thereby bring the first valve Va into the open state. Additionally, the seal pin 45 may be configured to be opened and closed using other mechanical (electrical) driving apparatuses, such as an electromagnetic solenoid.

The seal pin 45 in the present embodiment is provided with a protruding portion 52, which projects further toward the opening 31 than the seal surface 46 and which enters the communication space 41 in a closed state of the first valve Va. Although the protruding portion 52 in this embodiment is formed in a cylindrical shape corresponding to the shape of the communication space 41, it can be appropriately changed. The protruding portion 52 has an outer diameter smaller than an inner diameter of the communication space 41, and has a tip end provided with a tapering inclined surface 52a. In this way, when the seal pin 45 makes advancing and retracting movements along the axial direction, the protruding portion 52 is prevented from interfering with a boundary between the communication space 41 and the pin accommodating space 42.

Figure 11:
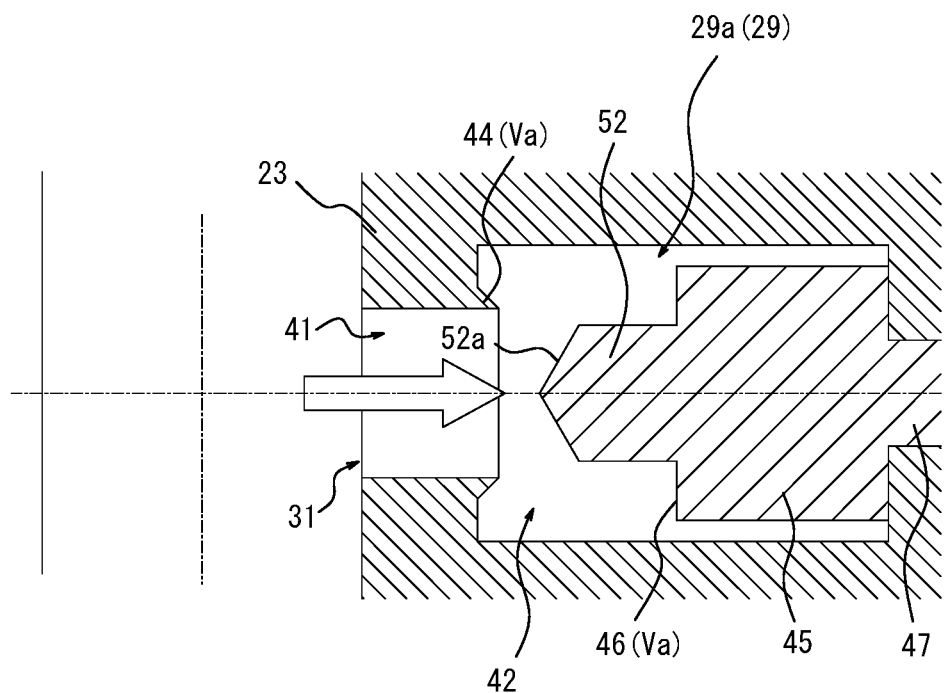
FIG. 11 is a sectional view, seen from the side direction, illustrating the valve of FIG. 9 in a fully open state.
Figure 12:
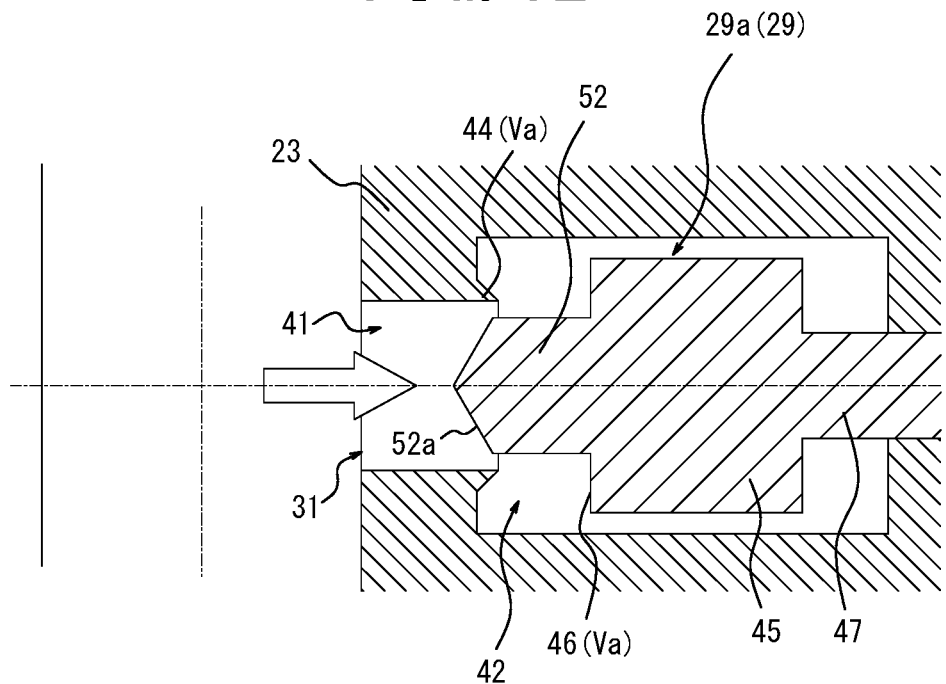
FIG. 12 is a sectional view, seen from the side direction, illustrating the valve of FIG. 9 in a half-open state.

The first valve Va may be switched between a fully open state, in which the seal pin 45 is at a position furthest from the opening 31 as illustrated in FIG. 11, a closed state, in which the seal pin 45 is at a position closest to the opening 31 and in which the first path 29a is closed as illustrated in FIG. 9, and a half-open state, in which the seal pin 45 is at a position between the aforementioned fully open state and the aforementioned closed state as illustrated in FIG. 12. Additionally, the first valve Va may be brought into the half-open state by, for example, controlling a flow rate, pressure, or the like of the pressurized medium, such as compressed air, supplied through the closed-side port 50 and/or the open-side port 51.

Hereinafter, the movement of the first valve Va will be described according to the flow of the above-described liquid container manufacturing method according to the present embodiment. In the aforementioned standby step, the first valve Va is brought into the fully open state, and the flow path 29 is brought into the drawing state, and thus, liquid-dripping from the blow nozzle 23 may be prevented. Additionally, in the standby step, the first valve Va only needs to be open, regardless of whether in the fully open state or in the half-open state.

In the aforementioned air discharge step, it is preferable to bring the first valve Va into the half-open state. By doing so, a width of a path leading from the communication space 41 to the pin accommodating space 42 is narrowed, and entry of the liquid L into the pin accommodating space 42 may be prevented, while a gap sufficient for air to be discharged is still provided. Additionally, the width of the path leading from the communication space 41 to the pin accommodating space 42 is narrowed by, for example, bringing, in the half-open state of the first valve Va, the protruding portion 52 to a position at which a portion thereof remains within the communication space 41. Further, in the air discharge step, the first valve Va may be brought into the fully open state. Moreover, in the air discharge step, the flow path 29 is brought into the exposed-to-atmosphere state or into the drawing state.

At the time of the liquid blow molding step and the first stage of suck-back in the headspace forming step, the first valve Va is in the closed state.

As illustrated in FIG. 9, in the closed state of the first valve Va, the seal surface 46 of the seal pin 45 is in abutment against the seal seat 44, and the protruding portion 52 enters the communication space 41 so as to close the communication space 41. At the time of the liquid blow molding step or the like, therefore, the liquid L is less likely to enter the communication space 41 through the opening 31. Further, even when the liquid L enters the communication space 41 in the fully open state or the half-open state of the first valve Va, the liquid L present in the communication space 41 can be pushed out through the opening 31 by later bringing the first valve Va into the closed state. Additionally, the protruding portion 52 is preferably configured so that, in the closed state of the first valve Va, the tip end of the protruding portion 52 is at a position corresponding to the inner circumferential surface of the blow nozzle 23, i.e., a position that is flush with the opening 31. This can increase the effect of preventing the liquid L from entering or remaining in the communication space 41, prevent the protruding portion 52 from projecting from the inner circumferential surface of the blow nozzle 23 and interfering with other members, and reduce the likelihood of the liquid L adhering to the tip end of the protruding portion 52. Additionally, the protruding portion 52 may project from the inner circumferential surface of the blow nozzle 23 in the closed state of the first valve Va. Further, the size of the protruding portion 52 can be appropriately changed, and may be, for example, a size that fills out the entire communication space 41.

At the time of the second stage of suck-back in the headspace forming step, the first valve Va is brought into the fully open state, and the flow path 29 is brought into the pressurized state. Additionally, during the second stage of suck-back, the first valve Va may be in the half-open state.

Figure 13:
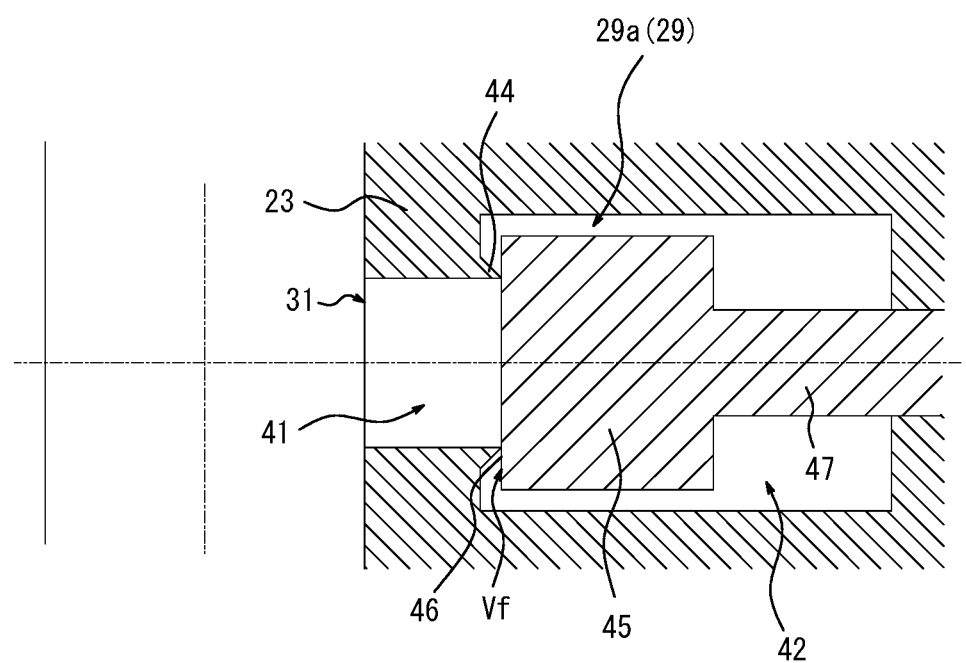
FIG. 13 is a sectional view, seen from the side direction, illustrating a valve as a comparative example.

With the above regards, FIG. 13 illustrates, as a comparative example, a valve Vf in which the seal pin 45 is not provided with the protruding portion 52 and in which a front end surface of the seal pin 45 is configured by a flat surface which is flush with the seal surface 46. In this case, because the communication space 41 is hollow and is always exposed to the inner circumferential surface of the blow nozzle 23 even when the valve Vf is brought into the closed state, the liquid L can enter and remain in the communication space 41 at the time of, for example, liquid blow molding and the first stage of suck-back. Then, at the time of the second stage of suck-back when pressurized air is introduced through the flow path 29 with the liquid L being present in the communication space 41, the liquid L remaining in the communication space 41, along with the air, can enter the container C while being bubbled. Further, due to the unwanted liquid L entering the container C at the time of the second stage of the suck-back, the headspace HS is likely to become smaller than a desired size. Further, due to the liquid L that has entered the communication space 41, when the blow nozzle 23 is disengaged from the mouth 2a of the container C after the liquid blow molding step or the like, liquid-dripping from the blow nozzle 23 can occur, and the liquid-dripping can result in adhesion of the liquid L to the mouth 2a.

In contrast, in the present embodiment, by providing the protruding portion 52 that is configured to be arranged in the communication space 41 in the closed state of the first valve Va, the liquid L is prevented from unwantedly entering and remaining in the communication space 41. This prevents generation of bubbles that is caused by the liquid L that has entered the communication space 41, while the pressurized gas is introduced. Further, in the present embodiment, the volume of the headspace HS is prevented from being destabilized due to the liquid L in the communication space 41 being returned into the container C during introduction of the pressurized gas. That is, in the present embodiment, the volume of the headspace HS is more likely to be stable. Furthermore, in the present embodiment, liquid-dripping from the blow nozzle 23 that is caused by the liquid L that has entered the communication space 41, and adhesion of the liquid L to the mouth 2a as a result of the liquid-dripping may be prevented.

Further, in the present embodiment, by performing the air discharge step in the half-open state of the first valve Va in which the seal pin 45 is at an intermediate position, (a part of) the path leading from the communication space 41 to the pin accommodating space 42 is narrowed, and entry of the liquid L into the pin accommodating space 42 may be prevented, while the gap sufficient for air to be discharged is still provided.

Although, in the above embodiment, an air flow path (i.e., discharge path) used when air in the interior of the preform 2 is discharged in the air discharge step and an air flow path (i.e., air introduction path) used when pressurized air is introduced partially have a common path segment at least in, for example, the first path 29a, the discharge path and the air introduction path may be provided separately. In that case, for example, an air introduction path which opens to the blow nozzle 23 may be provided in the blow nozzle 23, in addition to the flow path 29 as the discharge path used when air in the interior of the preform 2 is discharged in the air discharge step, and a valve similar to the first valve Va may be provided in the air introduction path. In this case also, it is possible to prevent the liquid L from unwantedly entering and remaining in a communication space of the air introduction path, by providing a protruding portion that enters the communication space of the air introduction path in the seal pin in the valve. This, in turn, prevents liquid-dripping in which the liquid L drips from the blow nozzle 23, when, for example, the blow nozzle 23 is disengaged from the mouth 2a of the container C. Additionally, in a case in which a plurality of flow paths which open to the inner circumferential surface of the blow nozzle 23 are provided as described above, the protruding portion only needs to be provided in the seal pin in the valve configured to open and close at least one of the flow paths, and it is more preferable that all the seal pins are provided with the protruding portion.

Needless to say, the present disclosure is not limited to the above embodiment, and various changes may be made without departing from the gist of the present disclosure.

For example, although the above embodiment illustrates an example for performing the liquid container manufacturing method according to the present disclosure using the liquid container manufacturing apparatus 1 having the configuration illustrated in FIG. 1, the liquid container manufacturing method according to the present disclosure may also be performed using a liquid container manufacturing apparatus having a different configuration or the like. The liquid container manufacturing apparatus 1 does not necessarily need to include the discharge rod 28.

Although in the above embodiment the interior of the preform 2 is exposed to the atmosphere in the air discharge step by bringing the flow path 29 into the exposed-to-atmosphere state, with the blow nozzle 23 being engaged to the mouth 2a of the preform 2, the present disclosure is not limited to the above embodiment. For example, in the air discharge step, an air discharge path may be provided from the interior of the preform 2 to the outside through a gap between an outer surface of the blow nozzle 23 and an inner surface of the mouth 2a, by bringing the blow nozzle 23 adjacent to, but not in engagement to, the mouth 2a of the preform 2.

Although in the above embodiment the pressurized liquid supply source 30 is the plunger pump, the present disclosure is not limited to the above embodiment, and any of various configurations, such as other types of pump, that are capable of pressurizing the liquid L to a predetermined pressure and supplying the pressurized liquid L to the preform 2, and producing the negative pressure to suck back the liquid L may be employed.

Although, in the rod purging step in the above embodiment, the discharge of the liquid L through the discharge port 28a of the discharge rod 28 is performed in the liquid L in the interior of the preform 2 prior to the molding and/or in the course of the molding into the liquid container C, the present disclosure is not limited to the above embodiment. For example, in the rod purging step, the discharge of the liquid L through the discharge port 28a of the discharge rod 28 may be performed always in the air. Further, although in the above embodiment the discharge of the liquid L through the discharge port 28a is performed always in the liquid L in the interior of the preform 2 in the rod purge step, an initial stage of the discharge may be performed in the air, and the subsequent discharge may be performed in the liquid L, for example. Further, it is possible to provide a step, performed prior to the rod purging step (e.g., prior to the standby step), of supplying the liquid L into the preform 2 in advance by using means other than the blow nozzle 23. Further, although in the above embodiment the rod purging step is performed in the course of the liquid blow molding step, the present disclosure is not limited to the above embodiment. For example, the rod purging step may be performed prior to the liquid blow molding step (e.g., prior to or in the course of the air discharge step, or between the air discharge step and the liquid blow molding step). Further, in the rod purging step, the discharge of the liquid L through the discharge port 28a of the discharge rod 28 may be performed in the liquid L in the interior of the liquid container C immediately after the container C is molded (prior to the first stage of suck-back), depending on conditions. The rod purging step, however, may also be omitted.

Although in the above embodiment the aforementioned air discharge step is performed, the air discharge step may also be omitted. Further, although, in the headspace forming step in the above embodiment, the first stage and the second stage of suck-back are performed, either or both of the first stage and the second stage of suck-back may be omitted.

As the preform 2, any of those with various shapes may be used in accordance with the shape or the like of the molded liquid container C.

REFERENCE SIGNS LIST

1 Liquid container manufacturing apparatus
2 Preform
2a Mouth
2b Trunk
10 Blow-molding mold
11 Cavity
20 Nozzle unit
20a Nozzle unit body
21 Body block
22 Support block
23 Blow nozzle
23a Liquid supply port
24 Longitudinal flow path
24a Seat
25 Supply port
26 Sealing body
26a Tapered surface
27 Shaft body
28 Discharge rod (stretching rod)
28a Discharge port
29 Flow path
30 Pressurized liquid supply source
30a Cylinder
30b Piston (plunger)
31 Opening
32 Drawing source
33 Pressurized gas supply source
34 First branching portion
35 Second branching portion
41 Communication space
42 Pin accommodating space
43 Connection port
44 Seal seat
45 Seal pin
46 Seal surface
47 Shaft
48 Piston
49 Cylinder chamber
50 Closed-side port
51 Open-side port
52 Protruding portion
52a Inclined surface
C Liquid container
L Liquid
P1 First pipe
P2 Second pipe
P3 Third pipe
S Branching portion
V1 Rod valve
Va First valve
Vb Second valve
Vc Third valve
Vd Fourth valve
Ve Fifth valve
HS Headspace
LP Lower half portion

The invention claimed is:

1. A liquid container manufacturing method for manufacturing, from a synthetic resin preform, a liquid container containing a content liquid using a nozzle unit and a blow-molding mold, wherein
the nozzle unit includes:
a liquid supply path that is connected to a pressurized liquid supply source and that extends to a blow nozzle; and
a flow path that extends from an opening provided on an inner circumferential surface of the blow nozzle to an interior of the nozzle unit and that is configured to be opened and closed by a valve embedded in the blow nozzle, and
the flow path includes:
a communication space adjacent to the opening; and
a pin accommodating space which is adjacent to the communication space and in which a seal pin configured to make advancing and retracting movements along an axial direction is arranged, and wherein
the seal pin has a protruding portion configured to enter the communication space in a closed state of the valve,
the liquid container manufacturing method comprising
a liquid blow molding step of molding the preform into the liquid container having a shape conforming to an inner surface of the blow-molding mold, by supplying, through the liquid supply path to an interior of the preform, a pressurized liquid using the pressurized liquid supply source in a state in which the blow nozzle is engaged to a mouth of the preform.

2. The liquid container manufacturing method according to claim 1, further comprising
a headspace forming step of forming a headspace in the liquid container, by discharging the liquid from an interior of the liquid container, wherein
in the headspace forming step, the liquid is discharged from the interior of the liquid container, by closing the liquid supply path and introducing a pressurized gas to the interior of the liquid container through the flow path.

3. The liquid container manufacturing method according to claim 1, further comprising
an air discharge step, performed prior to the liquid blow molding step, of discharging air in the interior of the preform to outside through the flow path, by supplying the liquid to the interior of the preform.

4. The liquid container manufacturing method according to claim 3, wherein
in the air discharge step, the valve is in a half-open state between a fully open state, in which the seal pin is at a position furthest from the opening, and the closed state, in which the seal pin is at a position closest to the opening.

5. The liquid container manufacturing method according to claim 1, wherein
before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

6. A liquid container manufacturing apparatus, comprising:
a nozzle unit; and a blow-molding mold, wherein
the nozzle unit includes:
- a liquid supply path that is connected to a pressurized liquid supply source and that extends to a blow nozzle; and
- a flow path that extends from an opening provided on an inner circumferential surface of the blow nozzle to an interior of the nozzle unit and that is configured to be opened and closed by a valve embedded in the blow nozzle, and the flow path includes:
- a communication space adjacent to the opening; and
- a pin accommodating space which is adjacent to the communication space and in which a seal pin configured to make advancing and retracting movements along an axial direction is arranged, and wherein the seal pin has a protruding portion configured to enter the communication space in a closed state of the valve, the liquid container manufacturing apparatus being configured to mold a preform into a liquid container having a shape conforming to an inner surface of the blow-molding mold, by supplying, through the liquid supply path to an interior of the preform, a pressurized liquid using the pressurized liquid supply source in a state in which the blow nozzle is engaged to a mouth of the preform.

7. The liquid container manufacturing method according to claim 2, further comprising
an air discharge step, performed prior to the liquid blow molding step, of discharging air in the interior of the preform to outside through the flow path, by supplying the liquid to the interior of the preform.

8. The liquid container manufacturing method according to claim 7, wherein
in the air discharge step, the valve is in a half-open state between a fully open state, in which the seal pin is at a position furthest from the opening, and the closed state, in which the seal pin is at a position closest to the opening.

9. The liquid container manufacturing method according to claim 2, wherein
before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

10. The liquid container manufacturing method according to claim 3, wherein
before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

11. The liquid container manufacturing method according to claim 4, wherein
before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

12. The liquid container manufacturing method according to claim 7, wherein
before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

13. The liquid container manufacturing method according to claim 8, wherein
before the blow nozzle is engaged to the mouth of the preform, and/or when the blow nozzle is disengaged from the mouth of the container after the liquid blow molding step, the valve is opened, and the flow path is connected to a drawing source configured to draw the liquid in the flow path.

* * * * *